United States Patent [19]

Murphy et al.

[11] Patent Number: 4,625,521
[45] Date of Patent: Dec. 2, 1986

[54] LIQUID NITROGEN DISTRIBUTION SYSTEM

[75] Inventors: John C. Murphy, Pittsburgh; Robert H. Swinderman, Mars, both of Pa.

[73] Assignee: Pittsburgh-Des Moines Corporation, Pittsburgh, Pa.

[21] Appl. No.: 733,055

[22] Filed: May 13, 1985

[51] Int. Cl.$^4$ .............................................. B01D 8/00
[52] U.S. Cl. ........................................ 62/55.5; 55/269; 62/268; 62/513; 165/104.32
[58] Field of Search ...................... 62/514 R, 513, 113, 62/55.5, 268, 100; 165/104.31, 104.32; 55/269

[56] References Cited

U.S. PATENT DOCUMENTS

| | | | |
|---|---|---|---|
| 3,049,913 | 8/1962 | Hunt | 62/268 |
| 3,149,775 | 9/1964 | Pagano | 62/268 |
| 3,273,636 | 9/1966 | Hickey et al. | 62/268 |
| 3,443,390 | 5/1969 | Webb | 62/268 |
| 3,566,960 | 3/1971 | Stuart | 165/104.31 |
| 3,851,274 | 11/1974 | Solin et al. | 165/104.31 |
| 4,024,903 | 5/1977 | Yamada et al. | 165/104.32 |
| 4,332,136 | 6/1982 | Quack | 62/514 R |

Primary Examiner—Ronald C. Capossela
Attorney, Agent, or Firm—Shoemaker and Mattare, Ltd.

[57] ABSTRACT

Apparatus for providing a simulated space environment for the testing of articles under low temperature conditions comprising a liquid nitrogen head tank, liquid nitrogen subcooler pumps, a liquid nitrogen subcooler coil, a liquid nitrogen head tank makeup pumps, a low pressure liquid nitrogen storage tank, a high pressure liquid nitrogen storage tank, a liquid nitrogen transfer pump, a vacuum chamber and thermal simulation heat exchanger shrouds contained within the vacuum chamber. Appropriate internal and external piping connects these components so that the apparatus can be operated both in a subcooled pressurized closed loop system as well as in a gravity convection system. While liquid nitrogen in this apparatus will produce a stable uniform temperature of −297° F. within the shroud containing the article to be tested, other liquids with similar low temperature characteristics may be used. A requirement for such liquids when used as a circulating medium with the apparatus herein is that the boiling point thereof at one atmosphere will produce the required test operating temperature.

13 Claims, 4 Drawing Figures

LIQUID NITROGEN DISTRIBUTION SYSTEM

BACKGROUND OF THE INVENTION

1. Field of the Invention

This invention relates generally to the simulation of cold temperatures in facilities utilizing a liquid medium such as Freon, liquid nitrogen and helium whose boiling point at one atmosphere provides the controlling temperature. Typical facilities in which this invention could be utilized are thermal vacuum test facilities, optical test facilities, wind tunnel test facilities, coating chambers and other test and manufacturing facilities requiring the simulation of a stable thermal environment.

2. Description of the Prior Art

Thermal simulation has been accomplished in facilities to date by the application of one of the following systems: one, a closed loop, pressurized, forced flow, subcooled system; two, a gravity feed convection system; or three, a boiling mode system. However, there is no thermal simulation system known to the applicants which combines into one common operating system a closed loop, pressurized, forced flow subcooled system together with a gravity feed convection system.

Recently there has been an increasing concern as to the reliability and economic operation of thermal simulation facilities due to the critical nature of the test specimens and increased length of test periods. Thus, there is an urgent need for a thermal simulation system which provides reliability, flexibility and economic operation over a wide range of requirements.

Existing prior art patents which may be pertinent to the present invention are as follows:

U.S. Pat. No. 3,566,960—3/2/71
U.S. Pat. No. 3,851,274—11/26/74
U.S. Pat. No. 4,024,903—5/24/77

None of the prior art patents teach the utilization of liquid nitrogen, which, while never completely changing state, is allowed to change slightly into the gaseous form, and thus due to the natural convection thereof, tends to cool the device being tested in the vacuum chamber. U.S. Pat. No. 3,851,274 generally relates to use of liquid nitrogen in a cooling system for a laser device. U.S. Pat. No. 3,566,960 relates to a cooling system for a process that is carried out in a vacuum chamber. U.S. Pat. No. 4,024,903 depicts a cooling system utilizing the natural circulation of cooling water.

None of the known prior art devices offer the new and novel features of the present invention.

SUMMARY OF THE INVENTION

It is an object of the present invention to provide a thermal simulation system to maintain thermal shrouds at a uniform controlled temperature with high heat loads which could be equal to one solar constant (130 watts per square foot). This same system will also provide a uniform thermal shroud temperature with high spot heat loads from the test environment.

A further object of this invention is to provide a thermal simulation system to maintain thermal shrouds at a controlled temperature with heat loads such as 30 watts per square foot. The above can be achieved through a gravity flow convection system.

Another object of the present invention is to provide a thermal simulation system to maintain thermal shrouds at a controlled temperature, thus protecting a test article in the event of power failure.

A further object of the present invention is to provide a thermal simulation system to maintain thermal shrouds at a controlled temperature with heat loads into the thermal shrouds which minimizes consumption of the circulating liquid medium.

A still further object of the present invention is to provide a thermal simulation system as defined above which can be operated in either a manual mode or an automatic mode.

The present invention has a number of new and novel features. For example, this invention comprises a unique liquid nitrogen circulation system which results from the combination of the characteristics of a forced flow recirculation system utilizing mechanical pumps and the characteristics of a gravity convection system utilizing a head tank and open circuits through which fluid can circulate and behave according to natural convection. In combining these two fundamental system, hardware modifications have been made which allow certain equipment to perform in either mode while still achieving the basic objective of heat transfer from a warm body (test specimen) to heat sink panels herein described as main shrouds or auxiliary shrouds.

This invention is applicable to facilities such as thermal vacuum space vehicle test facilities, optical test facilities, wind tunnel test facilities, coating chambers and other test and manufacturing facilities requiring the simulation of a stable thermal environment. The description herein is based on the application of a thermal vacuum test facility such as would be utilized for the testing of space vehicles. The thermal simulation system for such a facility utilizes liquid nitrogen as the circulating medium to simulate the temperatures of outer space in the test envelope.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
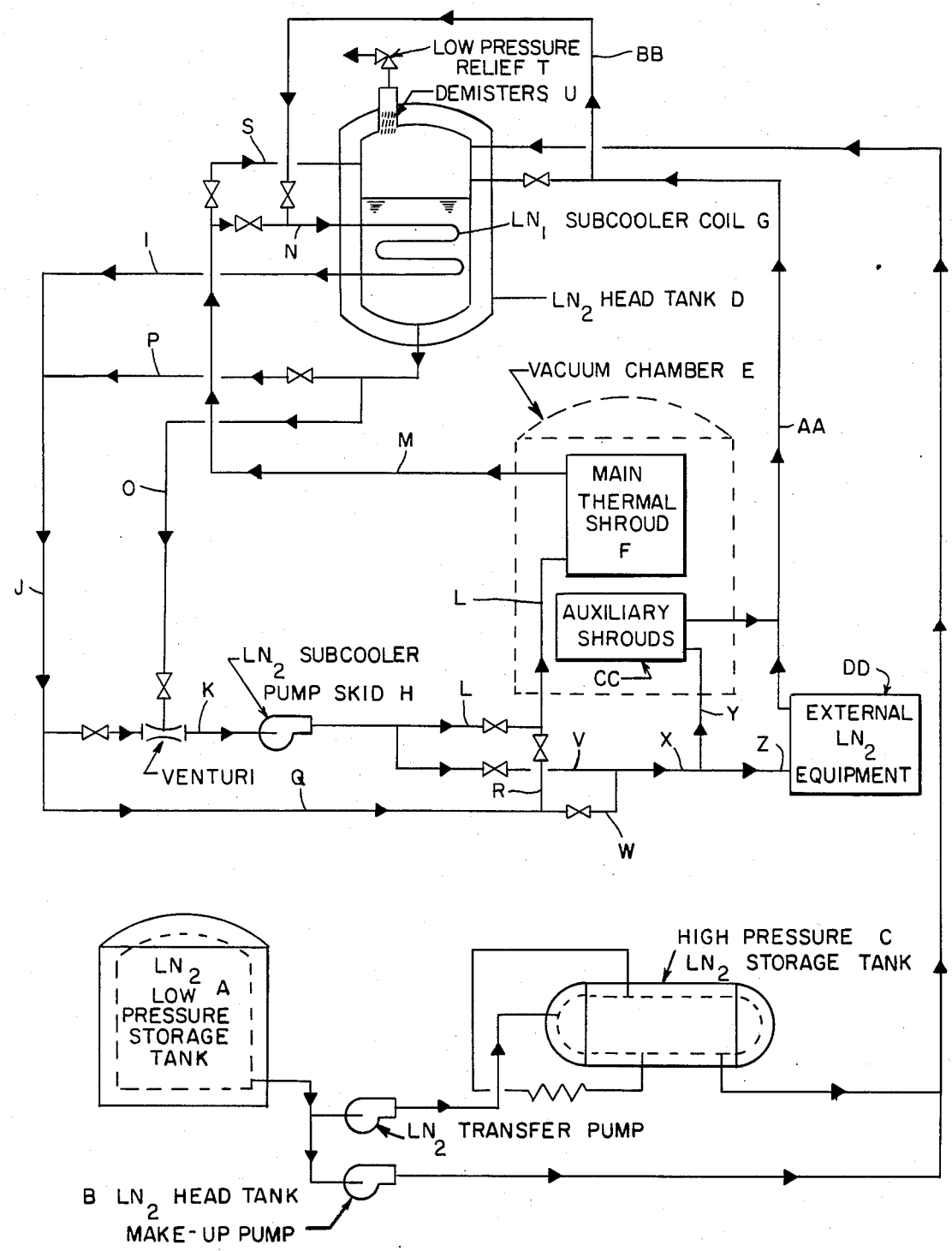
FIG. 1 is a schematic depiction of a facility of the present invention showing the main component units.

FIG. 1 shows a simplified schematic of the overall facility identifying the following main components: liquid nitrogen ($LN_2$) head tank, $LN_2$ subcooler pumps, $LN_2$ subcooler, $LN_2$ head tank makeup pumps, low pressure $LN_2$ storage tank, high pressure $LN_2$ storage tank, $LN_2$ transfer pump and vacuum chamber containing the thermal simulation shroud.

Figure 2:
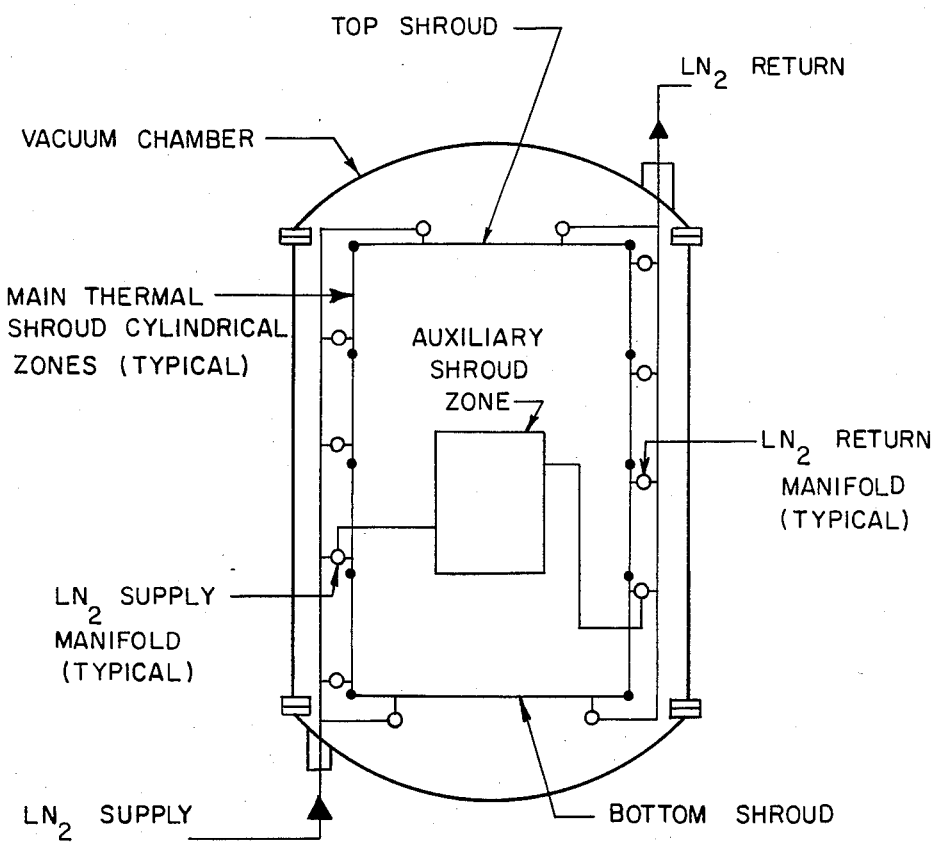
FIG. 2 shows the vacuum chamber from the system of FIG. 1 and the components contained therewithin.

The vacuum chamber is shown enlarged in FIG. 2. The thermal shroud inside the chamber is comprised of several cylindrical zones, a top and bottom shroud providing an optically dense envelope surrounding the space vehicle. The thermal vacuum facility usually requires the application of auxiliary shroud panels placed at random locations inside the test envelope. One such auxiliary shroud zone is shown in FIG. 2.

The liquid nitrogen (LN$_2$) is circulated through passages in the thermal shroud panels, thereby providing a stable uniform temperature of −297° F. of the shroud exposed to the test article. As previously mentioned, the thermal facility utilized for description of this invention utilizes liquid nitrogen as the circulating medium. This invention is applicable to other liquid as a circulating medium whose boiling points at one atmosphere will produce the required operating temperature. A requirement for such liquids when used as a circulating medium with the apparatus herein is that the boiling point thereof at one atmosphere will produce the required test operating temperature Other components applicable to a thermal vacuum facility as depicted in FIG. 1 are not shown herein, but are a part of this invention, as follows:
1. vacuum pumping system to evacuate the vacuum chamber;
2. gaseous nitrogen system to remove LN$_2$ from shroud;
3. gaseous nitrogen thermal system to maintain shrouds at +300° F. to −250° F.

The following description of the invention is based on the application of an LN$_2$ thermal system as shown in FIG. 2 that will maintain the thermal shrouds inside the vacuum chamber shown therein at or near LN$_2$ temperatures. The criteria governing the design of this system is as follows:
1. thermal shroud uniform heat load 200 KW (300 watts/ft$^2$);
2. maximum shroud temperature minus 285° F.;
3. thermal shroud size 30'$\phi$×58'-6 in height.

The description set forth below is divided into three parts: the pressurized closed loop forced flow mode of operation; the gravity feed convection system mode of operation; and common system elements.

Part 1—Pressurized Closed Loop Forced Flow Mode

Liquid nitrogen (LN$_2$) loss due to the heat load into the thermal shrouds (heat exchanger panels) F located in vacuum chamber E is supplied to the head tank D from the low pressure LN$_2$ storage tank A. The LN$_2$ head tank D is located at an elevation above vacuum chamber E. LN$_2$ is withdrawn from the bottom of storage tank A and pumped to the head tank D through a 23 gpm cryogenic pump B. An alternate means of supplying makeup LN$_2$ to the head is utilizing the high pressure LN$_2$ storage tank C to transfer LN$_2$ to the head tank D. The LN$_2$ head tank D is operated at or nearly equal to atmospheric pressure, and hence contains liquid boiling at thermal equilibrium saturation condition of approximately one atmosphere, thus providing a cold liquid (LN$_2$). The LN$_2$ head tank D contains an LN$_2$ subcooler coil G that is an integral part of the pressurized closed loop forced feed system.

LN$_2$ is supplied to the LN$_2$ subcooler pumps (180 gpm) H through conduits I, J and K which raise the system pressure to approximately 150 psi. The LN$_2$ is transferred through conduit L to the thermal shrouds F located in vacuum chamber E. The thermal shrouds F are exposed to the heat loads inside vacuum chamber E. As the fluid passes through the thermal shrouds F the pressure is sufficiently high so that the heat gained by the flow liquid raises the pressure in the fluid stream but it remains as a liquid (does not change phase). The liquid is then transferred through conduits M and N from the thermal shrouds F back to the LN$_2$ subcooler coil G which is immersed in the LN$_2$ in the head tank D. When the liquid passes through the coil, heat gained inside chamber E is exchanged to the colder liquid in the head tank, causing liquid in the head tank to boil more vigorously. As the liquid in the head tank is boiled off, it is again made up from pumping from the low pressure LN$_2$ tank A or by pressure transfer from high pressure tank C, as previously described. After the liquid passes through the subcooler coil G, it is nearly the same temperature as the head tank liquid. The liquid then flows to the pumps G through conduits I, J and K and continues circulation.

LN$_2$ for startup and system losses for the closed loop system is made up from the head tank D through conduit O to a suction venturi located near pump H suction.

Part 2—Gravity Feed Convection System

Liquid nitrogen (LN$_2$) loss due to the heat load into thermal shrouds is supplied to the head tank as previously described in Part 1. The primary difference in the gravity feed convection system is that the thermal shrouds F inside vacuum chamber E can be maintained at liquid nitrogen temperature without dependency on transfer pumps or electrical power.

LN$_2$ supply to the thermal shrouds F inside vacuum chamber E is provided from the liquid inside the head tank D. Liquid flows through conduits P, J, Q and R to the thermal shrouds. The inlet to the thermal shroud zone connects to the lower portion of each shroud zone. The liquid then flows progressively upward through the shroud zone or passage.

As the liquid flows it picks up heat due to heat flux from inside chamber E, thereby decreasing its density slightly, creating a pressure differential between any point in the thermal shroud and a corresponding point at the same elevation in conduit J. As the liquid continues to flow upwardly in pipe M, sufficient heat has been gained that at some elevaton at or below the head tank, the liquid becomes a two-phase mixture having less density than liquid in supply pipe J at the same elevation, thereby providing the driving force for the liquid, overcoming system friction losses and causing the liquid to flow by natural convection. The two phase mixture flows back to the head tank through conduits M and S.

Part 3—Common System Elements

The liquid capacity of the LN$_2$ head tank D is approximately 2,000 gallons. The liquid capacity of the LN$_2$ tank is maintained at a level sufficient to maintain the LN$_2$ subcooler coil G immersed in liquid. The LN$_2$ head tank incoporates a vapor space above the liquid that will allow phase separation of the two-phase flow returning to the head tank from the thermal shrouds through conduits M and S during the gravity feed convection system mode of operation (Part 2).

The LN$_2$ head tank is provided with a low pressure vapor venting system T. The venting system includes demister U to prevent loss of LN$_2$ through venting wet vapor.

Thermal Shrouds and LN$_2$ Distribution System

Figure 3:
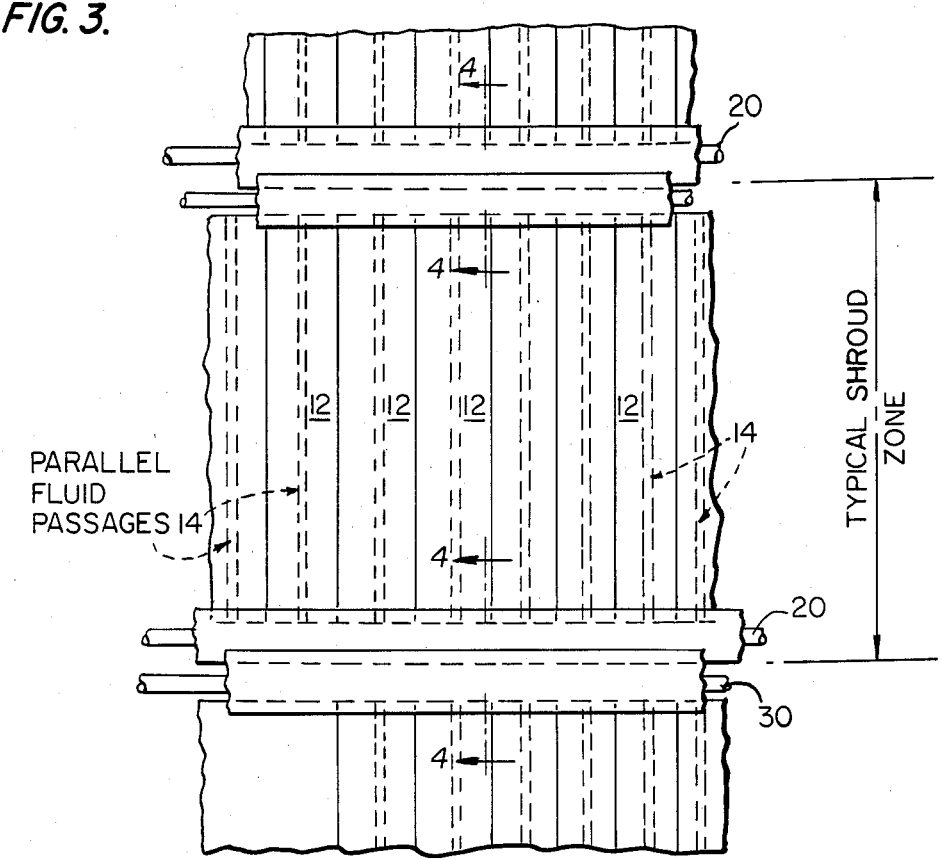
FIG. 3 is a side elevational view of a cylindrical shroud zone.

The thermal shroud consists of several cylindrical shroud zones; a top shroud and a bottom shroud as shown in FIG. 2. The LN$_2$ supply is connected to the bottom of each zone; correspondingly, the LN$_2$ outlet is located at the top of each zone. FIG. 3 shows a typical detail of a portion of a cylindrical shroud zone. The LN$_2$ thermal shroud is comprised of a number of thermal panels 12 each provided with a fluid passage 14. The spacing of the fluid passages 14 is dependent upon the heat load into the thermal shroud. Each fluid passage in a particular zone is connected to the inlet manifold 20 and an outlet manifold 30 to provide parallel liquid distribution through the shroud zone (see FIG. 4). This provides a continuous upward flow of liquid required for the gravity feed convection system mode of operation.

Figure 4:
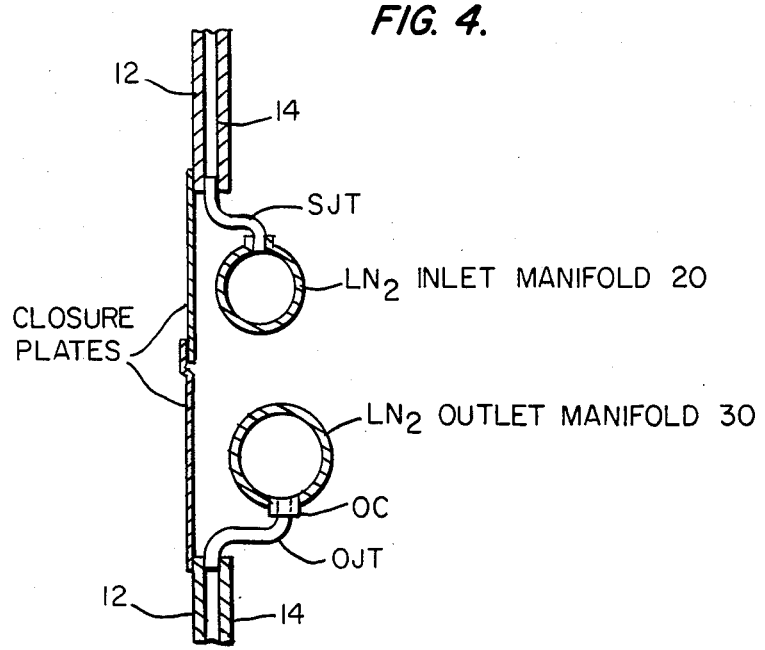
FIG. 4 is a cross-sectional view along line 4—4 of FIG. 3.

The individual liquid passages 14 are connected to the $LN_2$ inlet manifold 20 through a supply jumper tube SJT and to the $LN_2$ outlet manifold through an outlet jumper tube OJT (see FIG. 4). The outlet jumper tubes will be provided with an orifice coupling OC. The sizing of the orifice will insure fluid distribution throughout each shroud zone enabling a uniform thermal shroud temperature to be maintained.

The entire $LN_2$ distrubution system including external conduits in FIG. 1 will be sized to minimize pressure drop for the gravity feed convection system mode of operation and insure that a balanced liquid flow distrubution can be achieved for the operation of the combined systems.

Auxiliary Shrouds and External $LN_2$ Usage

The auxiliary $LN_2$ shrouds CC shown in FIG. 1 may be spaced at random inside vacuum chamber E. External equipment DD requiring $LN_2$ supply are cryopumps and vacuum roughing line traps. The nature and location of these items may not be applicable to $LN_2$ supply from the gravity feed convection system (Part 2). However, supply piping is provided through conduits W, X, Y and Z to allow liquid supply to these elements. The fluid then returns to the head tank D through conduit AA.

When operating in the pressurized closed loop forced flow mode (Part 1), liquid is supplied to the auxiliary shrouds CC and external equipment DD through conduits V, X, Y and Z. Liquid is then returned to the subcooler coil G in the head tank through conduits AA and BB.

When the main thermal shrouds F located in vacuum chamber E are in the gravity feed mode of operation (Part 2), a reduced flow cryogenic pump on $LN_2$ subcooler skid H can be utilized to supply liquid to the auxiliary shrouds CC and external equipment DD. Liquid is supplied to the main thermal shrouds F and the $LN_2$ subcooler pump skid H through a common supply header conduit J. Liquid is then supplied to the auxiliary shrouds CC and external equipment DD through conduits V, X, Y and Z. Liquid is then returned to the head tank D from the above equipment through conduit AA.

The foregoing is considered as illustrative only of the principles of the invention. Further, since numerous modifications and changes will readily occur to those skilled in the art, it is not desired to limit the inventon to the exact construction and operation shown and described, and accordingly, all suitable modifications and equivalents may be resorted to, falling within the scope of the invention.

We claim:

1. Apparatus for testing articles in a simulated space environment comprising:
    a circulation system means for simulating low temperatures of a space environment including;
    a vacuum chamber;
    internal and external piping means cooperating therewith in both a subcooled pressurized closed loop forced feed system and in a gravity convection system;
    heat exchanger means in said vacuum chamber connected to said piping means and cooperating with both of said systems; and
    a head tank means for supplying liquid nitrogen ($LN_2$) to both of said systems.

2. The apprataus for testing articles of claim 1, wherein said heat exchanger means are properly sized for accommodating the flow requirements of both the subcooled pressurized closed loop forced feed system and the gravity convection system.

3. The apparatus for testing articles of claim 1, wherein said head tank means includes a head tank structure which is physically located above said vacuum chamber so that sufficient liquid head is provided for fluid circulation through the system when the physical principles of two-phase flow are utilized on a return leg of piping from said heat exchanger means, and said head tank having sufficient volume therewithin to allow for vapor space in the upper area thereof together with a main vent for demisting return vapor from said head tank so that same will be dry.

4. The apparatus for testing articles of claim 3, together with a demister, a low pressure relief valve, and outlet piping.

5. The apparatus for testing articles of claim 1, together with external liquid nitrogen equipment.

6. The apparatus for testing articles of claim 1, together with subcooler means provided in association with the liquid nitrogen head tank.

7. The apparatus for testing articles of claim 1, together with liquid pumps for transferring fluid under pressure through the system.

8. A device for testing articles under low temperature conditions comprising: a head tank for containing liquid having low temperature characteristics, subcooler pumps, a subcooler coil, head tank makeup pumps, a low pressure liquid storage tank, a high pressure liquid storage tank, a liquid transfer pump, piping means for operatively connecting the aforesaid, and a vacuum chamber having thermal simulation shrouds therewithin; said thermal simulation shrouds within said vacuum chamber being comprised of several cylindrical zones with a top and bottom shroud providing an optically dense envelope surrounding an article to be tested.

9. The device for testing articles of claim 8, together with auxiliary shrouds placed at random locations inside the test envelope.

10. The device for testing articles of claim 9, wherein said liquid of low temperature characterisitics comprises liquid nitrogen ($LN_2$).

11. The device for testing articles of claim 10, wherein said liquid nitrogen is circulated through passages in said thermal shrouds whereby a stable uniform temperature of $-297°$ F. is provided for the test article.

12. The device for testing articles of claim 8, wherein said thermal shrouds comprise a plurality of panels, an inlet manifold connected to each of said panels, and an outlet manifold connected likewise thereto.

13. The device for testing articles of claim 8, together with an auxiliary shroud connected between said top and bottom shrouds.

* * * * *